Nov. 11, 1958     W. JUDA ET AL     2,860,097
SYNTHETIC ORGANIC CATIONIC POLYELECTROLYTES
AND METHOD OF MAKING THE SAME
Filed June 15, 1955
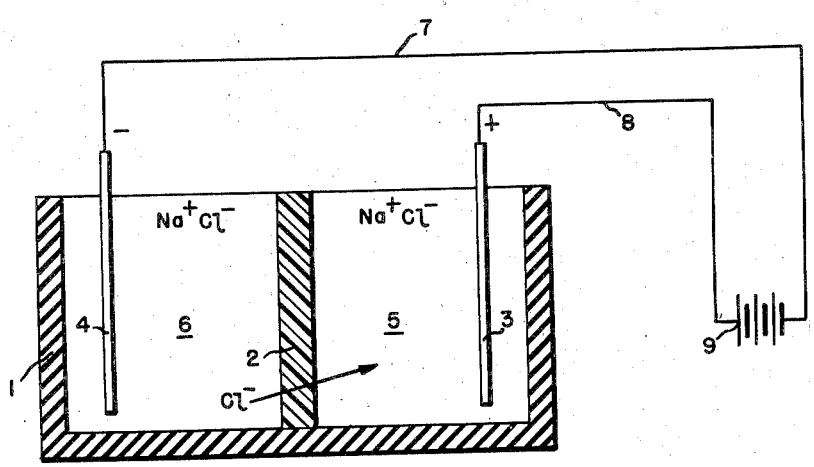
Inventors:
Walter Juda,
Allan H. Hamerschlag,
by    Goran Tushen
         Attorney

United States Patent Office 2,860,097
Patented Nov. 11, 1958

2,860,097

SYNTHETIC ORGANIC CATIONIC POLYELECTROLYTES AND METHOD OF MAKING THE SAME

Walter Juda, Lexington, and Allan H. Hamerschlag, Boston, Mass., assignors to Ionics, Incorporated, Cambridge, Mass., a corporation of Massachusetts Application June 15, 1955, Serial No. 515,748

16 Claims. (Cl. 204—180)

This invention relates to synthetic organic cationic polyelectrolytes comprising the aminated or quaternized products of haloalkylated copolymers of ethylenic aromatic and N-heterocyclic ethylenic compounds. It has for its primary object the preparation of these materials into linear, water soluble polyelectrolytes as well as cross-linked insoluble water-swellable polyelectrolytes in the granular or sheet form, the latter being anion selectively permeable, electrically conductive and hydraulically impermeable in character. The water soluble polyelectrolytes of this invention in the form of linear polymers of an ethylenic N-heterocyclic compound and a monoethylenic aromatic hydrocarbon having dissociable-electrolytic groups attached thereto have been found to be very useful as bacteriostatic and bactericidal agents, coagulants and flocculants, adhesives, soil additives and sequesterants.

In general, the process of the present invention comprises the copolymerization of an ethylenic N-heterocyclic compound with an ethylenic aromatic hydrocarbon. When the ethylenic aromatic compound is a monoethylenic compound, such as styrene, the polymer results in a soluble linear polyelectrolyte whereas when the ethylenic aromatic compound is a polyethylenic aromatic hydrocarbon, such as diisopropenyl benzene, cross-linking is effected and a solid, insoluble, infusible polyelectrolyte results.

The solid structures of this invention include solid solvated gels in the form of granules, sheets or membranes which have as a skeletal structure an insoluble, infusible polymeric matrix which includes polyethylenic aromatic hydrocarbons and ethylenic N-heterocyclic compounds with dissociable cationic groups bonded to the aromatic nuclei.

The presence of the cationic groups distributed throughout the matrix on the aromatic nuclei imparts to these structures a fixed cationic charge electrostatically associated with a mobile replaceable anion. Thus when the cationic groups are dissociated as occurs when the solvating liquid is water and the structure is a hydrous gel, these material exhibit anion exchange characteristics. Moreover, because a fixed positive charge is retained by the matrix throughout the gel, anions may be readily caused to permeate these structures while cations are repelled by the like charge of the matrix. These materials are accordingly electrically conductive and selectively permeable to anions.

Hitherto vinyl pyridine-polyvinyl hydrocarbon copolymers have been made in the granular form (Jackson U. S. Patent No. 2,540,985) but in this case pyridine nitrogen is quaternized whereas in the present case the quaternization (or amination in general) is effected on the nuclei of the aromatic hydrocarbon. Also, monovinyl and polyvinyl aromatic hydrocarbon copolymers containing amino alkyl groups on the aromatic hydrocarbon nucleus are known but in this case there is no vinyl pyridine present to give the desired and improved results of the present case. The former copolymers are of limited usefulness owing to the low thermohydrolytic stability of the quaternary alkyl pyridinium groups to reversion to a pyridine group which has an unsatisfactorily low (1.4×10$^{-9}$) ionization constant to be of use as a polyelectrolyte. On the other hand the latter copolymers are of limited water solubility unless the equivalent weight is below 300 since the aromatic hydrocarbon residues are not appreciably soluble in water. This may be illustrated as shown in the table. The present copolymers combine thermohydrolytically stable ionic groups with a substantially water solvatable skeletal structure.

| Compound | Solubility: grams per liter of water |
|---|---|
| Benzene | 0.7 g. at 22° C. |
| Pyridine | Infinitely soluble. |
| Toluene | Insoluble. |
| Alpha picoline | Very soluble. |
| Beta picoline | Infinitely soluble. |
| Gamma picoline | Do. |
| Xylene | Insoluble. |
| 2,5-Lutidine | 25. |
| 2,4-Lutidine | 20. |

The process of producing the solid, infusible, structures of the present case consists first in forming a solid solvated gel structure which is coherent and homogeneous, and which comprises a cross-linked polymeric matrix having aromatic and N-heterocyclic nuclei and a continuous liquid phase in gel relationship with the matrix. The gel structures are thereafter haloalkylated and treated with ammonia or an organic amine to incorporate dissociable groups on the ring nuclei. Such bond groups desirably have a dissociation constant of about 10$^{-5}$ or greater. For example, the approximate ionization constants of a number of residues are shown:

| Group | Ionization Constant | Configuration |
|---|---|---|
| Benzylamine | 2.0×10$^{-5}$ | 1 |
| NNDiethyl benzylamine | 3.0×10$^{-5}$ | 2 |
| NNDimethyl benzylamine | 8.5×10$^{-6}$ | 3 |
| Methyl benzylamine | 2 ×10$^{-5}$ | 4 |
| Beta phenyl ethylamine | 6.8×10$^{-5}$ | 5 |
| Beta phenyl ethyl methylamine | 1.4×10$^{-4}$ | 6 |
| Gamma phenyl propylamine | 2.5×10$^{-4}$ | 7 |
| NNIsopropyl benzylamine | 4.2×10$^{-5}$ | 8 |
| Delta phenyl butylamine | 4 ×10$^{-4}$ | 9 |
| Gamma phenyl dipropylamine | 8 ×10$^{-4}$ | 10 |

The configuration of these groups are as follows:

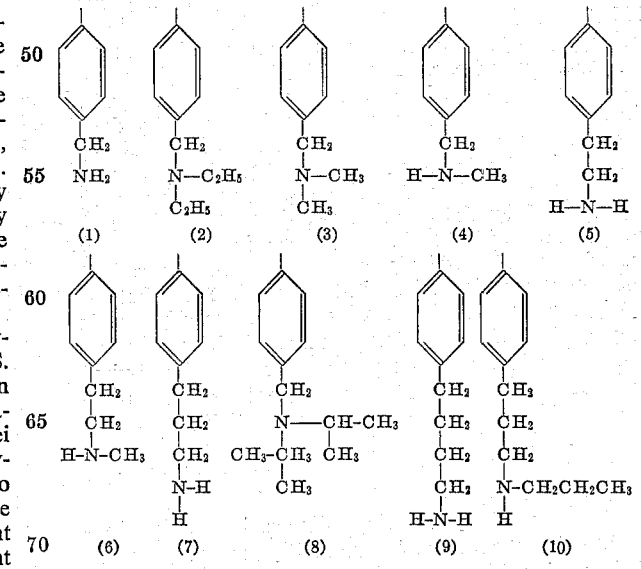

The active residues in the products resulting from the amination of the haloalkylated copolymers of this invention would be expected to have ionization constants similar to those of the representative model compounds listed above.

The gel structure, formed by dissolving in a suitable organic solvent material suitable for membranes or sheets, is polymerizable to a solid cross-linked structure having ethylenic aromatic and ethylenic N-heterocyclic nuclei, disposing the solution to the desired form (i. e. membranes or sheets) and then effecting polymerization under conditions preventive of the evaportaion of solvent. (If granular materials suitable for conventional ion exchange are required, it is not necessary to carry out the polymerization under conditions preventive of the evaporation of solvent.) The polymerizable ingredients thus polymerize while in solution to a cross-linked insoluble matrix which uniformly permeates the mass of the solution and occludes the solvent as a solvating or swelling liquid phase of a coherent homogeneous gel. The polymeric matrix is thus formed to accommodate the liquid phase and results in a highly solvated gel having an unstressed solid matrix. The volume of the solvent has been found to determine or fix the equilibrium liquid volume of the gel structure. That is, the gel retains about the same volume of liquid when one liquid is displaced by another, or when it is partially dried and resolvated. It has further been observed that the solid gel structure is subject to shrinkage when solvent is removed from it, as by evaporation, which indicates a non-rigid solvated structure having limited extensibility.

The prevention of loss of solvent during polymerization of sheets or membranes is an important feature of this invention; it makes it possible to produce a continuous homogeneous product having the desired characteristics of mechanical and hydraulic stability. In the processes of the prior art, wherein polymerization is not effected in the presence of a solvent or wherein the solvent if present is permitted to evaporate, the polymers consist either of vitreous, non-permeable structures, characteristic of molding resins, or of fractured particulate structures characteristic of ordinary granular ion-exchange resins. Polymeric structures which are not formed in the presence of a solvent may be solvated to some extent by immersing them in a solvating liquid, but the result is to subject the polymeric structure to severe swelling stresses which seriously impair their mechanical strength, frequently to the point of causing fracturing of the structure. The structures of the present invention are not subject to these stresses.

The polymerizable materials from which the polyelectrolytes are formed are ethylenic aromatic and ethylenic N-heterocyclic compounds copolymerizable to linear polymers or to three dimension, cross-linked matrixes. The majority of such ethylenic compounds which are available in practical quantities are vinyl compounds, though it will be understood that vinylene and vinylidene compounds are equally useful. In the remainder of this specification and in the claims such ethylenic compounds are referred to as vinyl compounds. Cross-linking may be provided by the aromatic vinyl compound itself in combination with the N-heterocyclic ingredient or by materials copolymerizable therewith to form cross-links between polymeric chains of the aromatic and N-heterocyclic compounds. For instance, the polymeric matrix may be formed by copolymerization of divinyl benzene (with or without a monovinyl benzene) with 2-vinyl pyridine. Owing to the pair of vinyl groups on the monomeric aromatic molecule a cross-linked structure is produced. When divinyl benzene is used as a cross-linking material, satisfactory results are attained when it is included with a monovinyl aromatic compound such as styrene, ethyl styrene, vinyl toluene, isopropenyl benzene, chlorostyrene, alpha methylstyrene, vinyl naphthalene, vinyl biphenyl and derivatives thereof, in combination with a N-heterocyclic compound such as 2-vinyl pyridine, 4-vinyl pyridine, 5-ethyl 2-vinyl pyridine, 5-vinyl 2-methyl pyridine, vinyl quinoline, vinyl carbazole, vinyl pyrrolidone, etc., to the extent of 15 mol percent based on total polymerizable ingredients, but preferred embodiments include higher proportions, such as 33 percent, even up to 70 percent. There may also be included with the vinyl aromatic-vinyl heterocyclic compounds limited amounts of aliphatic material copolymerizable therewith, e. g. butadiene, alkyl acrylate esters, and acrylate esters, acrylonitrile, vinyl halides, and methyl vinyl sulfide, but their presence inherently reduces the concentration of N-heterocyclic nuclei and aromatic nuclei susceptible to haloalkylation and amination, and tends to result in a lower ion-exchange capacity. Suitable cross-linking materials in addition to divinyl benzene are divinyl ether of ethylene glycol, divinyl ether of diethylene glycol (divinyl Carbitol), vinyl methacrylate, etc.

The reactions may be represented for example as follows:

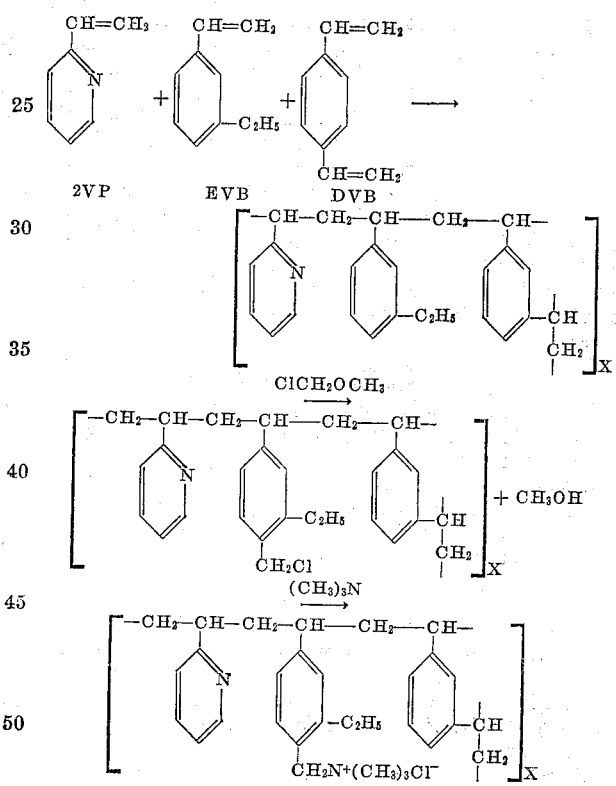

In general, the reactive amine has the formula $R_3N$ where R is hydrogen or an aliphatic radical preferably containing less than 4 carbon atoms. Suitable amines for reaction with the halo alkyl group in addition to ammonia include primary amines such as methylamine, ethylamine, propylamine, ethanolamine, butylamine; secondary amines such as dimethylamine, diethylamine, dipropylamine, diethanolamine, methyl ethanolamine, methyl ethylamine, dibutylamine and N-methylaniline; and tertiary amines such as trimethylamine, methyl diethanolamine, triethanolamine, dimethyl ethanolamine, triethylamine, NN dimethylaniline, pyridine, picoline, lutidine, and collidine. The resulting active group has a formula of $C_nH_{2n}NR_3X$, X being an anion such as $OH^-$, $Cl^-$, $SO_4^=$, $HCO_3^-$, acetate, etc. where $n$ is 1, 2, 3, or 4. The resulting soluble or insoluble polyelectrolyte has a dissociation constant of $10^{-5}$ or greater for the active groups and contains in addition heterocyclic nitrogen therein.

A solid gel structure is formed by dissolving the polymerizable materials with or without a suitable catalyst in from about 20% to about 70% of an organic solvent (by volume on total volume) and then effecting polymerization of the dissolved material under conditions which prevent the escape of solvent. In general, such suitable solvents should be inert during polymerization and should be solvating or swelling agents for the polymerized gel structure. The following solvents are recommended: benzene, toluene, xylene, diethyl benzene, diisopropyl benzene, and dioctyl phthalate. Polymerization is effected by any suitable expedient such as heat or light and is continued until an insoluble, infusible, solvated gel is formed. In the preferred embodiment utilizing divinyl benzene, monovinyl aromatic compounds such as styrene or ethyl styrene and 2-vinyl pyridine, preferred organic solvents include diethyl benzene and diisopropyl benzene, and the most satisfactory results are obtained when the solvent is present to the extent of about 30 to 50% by volume. However, as already indicated, as little as 20% solvent or as much as 70% has been found satisfactory.

Membrane structures produced in accordance with this invention are advantageously formed to occlude a reinforcing material or web such as felts, fabrics, mats, etc. in order to increase the mechanical strength (tensile strength and tear resistance) of the membrane. Suitable reinforcing materials include in general woven or felted sheet materials such as glass filter cloth, polyacrylonitrile screen, glass paper, treated cellulose paper, and fiber mats of polystyrene-coated glass fibers and similar porous materials of appreciable strength which are not attacked substantially during the polymerization, halo alkylation and amination steps. In forming a reinforced membrane, a suitable technique is to place the reinforcing sheet on a flat casting surface (such as glass, or stainless steel plate), pour the solution of polymerizable ingredients onto the casting surface embedding the reinforcing sheet, then place a second flat surface over the cast to prevent evaporation of solvent, and finally heat the solution and plates to cause polymerization. The cured cast is then leached preferably with a non-aromatic solvent (such as ethylene dichloride, perchlorethylene etc.) to remove the bulk of the non-polymerized aromatic material and to replace the organic solvent of polymerization with a solvent inert to haloalkylation. The haloalkylation solvent must be a swelling agent for the polymer and must not be permitted to escape substantially.

The gel structure is haloalkylated by treating it with well-known haloalkylating agents under conditions which do not result in loss of gel liquid. Apparently, the continuous liquid phase throughout the gel makes it possible to treat the structure with a haloalkylating agent and obtain substantially uniform haloalkylation throughout the structure. One preferred method of haloalkylation comprises immersing the polymerized gel in a chloromethyl alkyl ether with or without an inert solvent or diluent in which is dissolved a suitable Friedel-Crafts catalyst such as aluminum chloride, stannic chloride or titanium tetrachloride. This may be done at room temperature and requires about an hour or more to treat a membrane of about 1 mm. in thickness. It will be understood, that the requisite time of immersion depends largely on the shape and size of the article and reactivity of the chloromethylating bath and may, accordingly, be considerably longer. Chloromethylation results in the bonding of chloromethyl groups to the aromatic nuclei according to the equation:

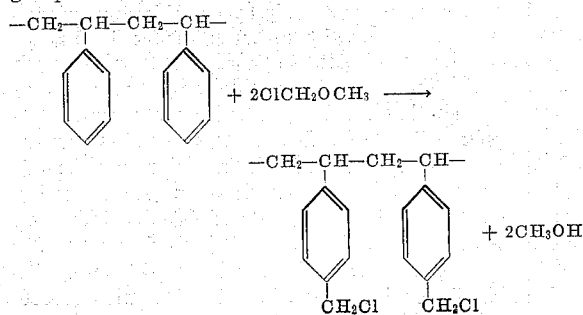

The final step in the process comprises the treatment of the haloalkylated gel structure with an amine or ammonia to form an amine of higher degree or quaternary ammonium chloride groups from the haloalkyl groups according to the typical reaction:

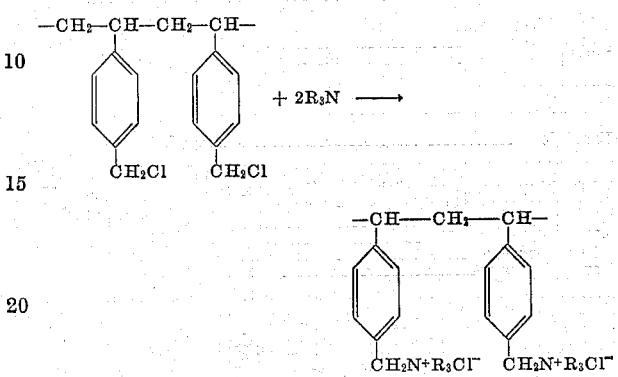

where R represents hydrogen alkyl or alkylol functions. Suitable amines, already referred to, comprise in general ammonia and its alkyl and/or alkanol substituted derivatives, where preferably such derivatives have four or fewer carbon atoms. The quaternary ammonium halide groups are preferred for most applications since they are highly dissociable into a positively charged radical bonded to the aromatic nuclei, and hence, fixed to the polymeric structure, and a negatively charged free mobile halide ion in electrostatic association with the positive charges of the polymeric matrix. Quaternization is conveniently carried out by immersing the haloalkylated gel structure in a solution of a tertiary amine, for instance, it may be immersed in a 25% aqueous solution of trimethylamine. After quaternization, the gel structure is washed with water to remove unused reactants, and is ready for use. The gel structure when treated with water during quaternization is converted to the hydrous form, the water displacing the solvent previously present. A characteristic of the gel structures of this invention is that one solvating liquid may be replaced by others.

These structures in the hydrous chloride form have been found to have high electrical conductivity generally in excess of $5 \times 10^{-3}$ ohm$^{-1}$ cm.$^{-1}$.

Structures of any desired form or size may be made in accordance with this invention by casting or molding (including pressure molding) or otherwise forming a solution of the polymerizable monomers and effecting polymerization in the mold while preventing the evaporation or escape of substantial amounts of solvent, for instance, by closing the mold or by otherwise carrying out the polymerization under substantially saturated solvent condition. In this way, forms and structures may be obtained in far greater size than structures in which conventional ion-exchange materials have been made in the past. Of particular interest is the fact that continuous hydraulically impermeable uniform sheets or membranes may be formed in accordance with this invention. Moreover, the molded article may be machined by conventional techniques.

The present invention and its objects, features and utility will be better understood from the following detailed description of preferred embodiments thereof and from the drawing showing a diagrammatic elevation in cross section of an electrodialytic cell containing a membrane produced in accordance with the invention.

The divinyl benzene used in the examples is the commercial grade which is obtainable under several concentration designations. The actual analysis of the grades used herein are given below:

TABLE I

| Designation | 20%-25% DVB | 40%-50% DVB | 50%-60% DVB |
|---|---|---|---|
| Divinyl benzene____percent by weight__ | 17 | 47 | 54 |
| Ethyl styrene_____do____ | 49 | 43 | 40 |
| Diethyl benzene_____do____ | 34 | 10 | 8 |

| Example | I | II | III |
|---|---|---|---|
| Divinyl benzene, commercial 40%-50% grade___cc__ | 55 | 55 | 55 |
| Divinyl benzene, commercial 20%-25% grade___cc__ | 45 | 45 | 45 |
| 2-Vinyl pyridine, inhibitor-free_____cc__ | 32.5 | 65.2 | 0 |
| 2-Vinyl 5-ethyl pyridine_____cc__ | 0 | 0 | 41.4 |
| Diethyl benzene_____cc__ | 48.7 | 66.0 | 52.3 |
| Benzoyl peroxide_____g__ | 0.8 | 1.05 | 0.82 |

The ingredients were mixed thoroughly at room temperature and cast between two glass plates 0.1 cm. apart on a reinforcing of glass filter cloth. A tray was filled with some of the mixture and the cast submerged in it. The tray was heated at 80° C. for 14 hours to form a membrane of a gel comprising a matrix of divinyl benzene-ethyl vinyl benzene-vinyl pyridine copolymer and a solvating liquid phase of diethyl benzene. The cast was allowed to cool and the membrane removed from the glass plates and immediately leached with ethylene chloride.

The membranes were thereafter immersed in a mixture of

|  | Parts by weight |
|---|---|
| Chloromethyl ether | 30 |
| Ferric chloride (anhydrous) | 3 | for 14 hours at room temperature. The excess chloromethyl ether solution was removed by leaching with methanol. The chloromethylated membranes were converted to the quaternary ammonium salt by prompt immersion in a 25% aqueous solution of trimethylamine for 24 hours at room temperature.

The final membranes were yellow in color and physically strong. After thorough leaching in water, their physical properties were determined. They are tabulated in Table II.

TABLE II

| Example | I | II | III |
|---|---|---|---|
| Conductivity, ohm cm | 175 | 125 | 180 |
| Capacity, meq./dry gram resin | 2.2 | 2.2 | 2.0 |
| Water content, percent by weight of resin | 35 | 37 | 35 |

In the examples divinyl benzene is the preferred polyvinyl aromatic compound used in conjunction with styrene and/or ethyl styrene, and 2-vinyl pyridine is the preferred N-heterocyclic compound. It will be understood from the foregoing, however, and from the nature of the chemical reactions involved during the haloalkylation and amination that membrane structures in accordance with the present invention may be made from a great number of polymerizable aromatic and N-heterocyclic vinyl compounds, provided there is present an amount of polymerizable polyvinyl compound in excess of 15 mol percent. In other words, the matrix must be suitably cross-linked and must also contain aromatic nuclei which may be haloalkylated and subsequently aminated. Other polyvinyl aromatic compounds which may be used for cross-linking include divinyl toluene, divinyl naphthalene, divinyl diphenyl, divinyl diphenyl ether, diisopropenyl benzene, divinyl ether of ethylene glycol, vinyl methacrylate and the substitute alkyl derivatives thereof, such as dimethyl- divinyl benzene and similar polymerizable aromatic compounds which are poly-functional in vinyl groups.

Haloalkylation can be performed with haloalkylating agents other than chloromethyl ether, such as other haloalkyl ethers of the general formula $$R'-O-\overset{R}{\underset{|}{C}H}-X$$

(where R is hydrogen or an alkyl group preferably no higher than butyl, R' is an alkyl group preferably no higher than butyl, and X represents chlorine, bromine or iodine), and mixtures of hydrogen halides and aliphatic aldehydes, e. g. hydrogen bromide and acetaldehyde. Similarly, the preferred amination, quaternization may be performed with a great number of aliphatic or alicyclic tertiary amines, including tripropylamine, ethylpropylisobutylamine; dimethylaniline, methyl ethyl aniline and other dialkyl anilines; dimethyl toluidine; pyridine; quinoline; 2-methylquinoline; methyltetrahydroquinoline; triisoamylamine, to name but a representative few, dissolved in a polar solvent such as water or lower aliphatic alcohols.

In the examples the benzoyl peroxide was included to catalyze the polymerization. Other suitable catalysts are 2-azo bis isobutyro nitrile cumene hydroperoxide and other catalysts and/or accelerators for free radical polymerizations, and boron trifluoride and other catalysts for polymerization by the ionic mechanism.

*Example IV*

This example illustrates the preparation of the soluble linear polyelectrolytes of the invention.

About 100 grams of para methoxy styrene and 100 grams of 1-vinyl-2-pyrrolidone were mixed with about 0.4 gram of azo bis (isobutyronitrile) and heated at 80° C. for about 20 hours at atmospheric pressure and then at 135° C. under vacuum for 5 hours. While still hot, the polymer was poured into a tray. It hardened on cooling to room temperature and was pulverized and dissolved in choloromethly ether containing 5 percent anhydrous stannic chloride. The mixture was allowed to stand for 24 hours at room temperature. It was then poured into water to precipitate the polymer. The resulting solid was washed with water and then dissolved in aqueous trimethylamine and allow to stand 24 hours. This solution was poured into several volumes of acetone to precipitate the product which was dried at 60° C. The product was water soluble and contained over 2 meq. per gram of strongly basic quaternary ammonium groups.

A simple electrodialysis cell utilizing a membrane of the present invention is shown in the drawing. It consists of a container 1 separated into compartments 5 and 6 by a membrane 2 prepared in accordance with any of the foregoing examples. A graphite anode 3 is situated in compartment 5 and a graphite cathode 4 is situated in compartment 6. Power leads 7 and 8 connect these electrodes 3 and 4 with a source of voltage, for example, a D. C. battery 9. The compartments 5 and 6 each contain an electrolytic solution of 0.03 N sodium chloride. It is found that the current passing between the electrodes 3 and 4 is carried across the membrane 2 almost exclusively by chloride ions migrating from compartment 6 into compartment 5. In this apparatus, the membrane 2 provides a barrier which makes it possible to transfer chloride ions from one solution to another to the substantial exclusion of cation transfer. Representative processes and apparatus in which the membranes of this invention may be advantageously utilized are described in the following copending applications and patent: Walter Juda and Wayne A. McRae, Ser. No. 207,289, filed January 23, 1951, now Patent No. 2,767,135; Davis R. Dewey III and Edwin R. Gilliland, Ser. No. 213,514, filed March 2, 1951, now Patent No. 2,741,592; and U. S. Pat. No. 2,636,852 (Juda et al.), issued April 28, 1953.

Having thus disclosed our invention, we claim and desire to secure by Letters Patent:

1. A polymeric electrolyte comprising a copolymer of a vinyl N-heterocyclic compound and a vinyl aromatic compound, said aromatic compound having bound to the aromatic nucleus an amine group of the formula $C_nH_{2n}NR_3X$, where $n$ is no greater than 4, R is selected from the group consisting of hydrogen and an aliphatic radical containing no greater than 4 carbon atoms, and X is an anion, said N-heterocyclic compound being present in amount between 15 and 70 mol percent of the copolymer, and said amine group present in amount exceeding 0.3 meq. per gram of copolymer.

2. The polymeric electrolyte of claim 1 wherein the polyelectrolyte is water soluble and is a copolymer of a monovinyl N-heterocyclic compound and an aminated haloalkylated monovinyl aromatic compound.

3. The polyelectrolyte of claim 2 wherein the monovinyl N-heterocyclic compound is of the group consisting of 2 vinyl, 4 vinyl, and 5 ethyl, 2 vinyl pyridine and the monovinyl aromatic compound is of the group consisting of styrene and vinyl toluene.

4. As an article of manufacture, a solid, infusible, insoluble structure comprising a copolymer of a vinyl N-heterocyclic compound and a polyvinyl aromatic compound, said compound having bound to the aromatic nucleus an amine group of the formula $C_nH_{2n}NR_3X$, where n is no greater than 4, R is selected from the group consisting of hydrogen and an aliphatic radical containing no greater than 4 carbon atoms, and X is an anion, said N-heterocyclic compound being present in an amount between 15 and 70 mol percent of the copolymer, and said amine group being present in amount exceeding 0.3 meq. per gram of copolymer.

5. As an article of manufacture, a solid insoluble, infusible, anion-exchange structure comprising a crosslinked copolymer of a vinyl N-heterocyclic compound and a quaternized derivative of a haloalkylated vinyl aromatic compound in gel relationship with from 20% to 70% by volume of a solvating liquid, said copolymer being a selectively anion permeable and electrically conductive solid structure.

6. As an article of manufacture, a solid, unfractured, insoluble, and infusible structure in the form of a sheet comprising a copolymer of a vinyl N-heterocyclic compound and a polyvinyl aromatic hydrocarbon, said hydrocarbon having bound to the aromatic nucleus an amide group of the formula $C_nH_{2n}NR_3X$, where $n$ is an integer no greater than 4, R is selected from the group consisting of hydrogen and an aliphatic radical containing no greater than 4 carbon atoms, and X is an anion, said N-heterocyclic compound being present in amount betweeen 15 to 70 mol percent of the copolymer, and said amine group being present in amount exceeding 0.3 meq. per gram of copolymer.

7. As an article of manufacture, a solid, unfractured, anion-exchange structure in the form of a sheet, said structure having a reinforcing sheet material therein, and comprising a substantially insoluble, infusible polymeric matrix which is a copolymer of a polyvinyl aromatic compound and a vinyl N-heterocyclic compound having dissociable quaternary ammonium groups bound to at least some of the aromatic nuclei in gel relationship with from 20% to 70% of an aqueous solvating liquid, by volume on total volume, said liquid presenting a continuous phase throughout said gel, said polyvinyl aromatic compound exceeding 15 mol percent based on the total vinyl compound.

8. The article of claim 7 wherein the vinyl N-heterocyclic compound is selected from the group consisting of 2 vinyl pyridine, 4 vinyl pyridine, 2 vinyl 5 ethyl pyridine and mixtures thereof.

9. The method of forming a polymeric electrolyte of a copolymer of a vinyl N-heterocyclic compound and a vinyl aromatic hydrocarbon comprising dissolving at least one polymerizable vinyl aromatic compound selected from the group consisting of the vinyl aromatic hydrocarbons and the substituted halo and alkyl derivatives thereof in combination with a N-heterocyclic vinyl compound to the extent of at least 15 mol percent based upon total polymerizable ingredients, in from about 20% to about 70% of an organic solvent, by volume on total volume, polymerizing the solute, haloalkylating the copolymer and treating the same with an amine of the formula $NR_3$, where R is selected from the group consisting of hydrogen and an aliphatic radical containing no more than 4 carbon atoms.

10. The method of making a polymeric electrolyte of claim 9, wherein the polymerizable vinyl compounds are a monovinyl N-heterocyclic compound and a monovinyl aromatic compound whereby a water soluble polyelectrolyte is produced.

11. The method of forming a solid, infusible, insoluble structure of claim 9 wherein the polymerizable vinyl aromatic compounds comprise a polyvinyl aromatic hydrocarbon whereby a solid, infusible, insoluble polyelectrolyte is produced.

12. The method of forming a solid anion permeable unfractured, infusible structure in the form of a sheet of a copolymer of a vinyl N-heterocyclic compound and a vinyl aromatic hydrocarbon comprising-dissolving polymerizable vinyl aromatic compounds selected from the group consisting of vinyl aromatic hydrocarbons and mixtures thereof, in combination with a crosslinking agent therefor and a N-heterocyclic vinyl compound to the extent of at least 15 mol percent based upon total polymerizable ingredients, in from about 20% to 70% of an organic solvent by volume on total volume, polymerizing the solute under conditions substantially preventive of the escape of solvent to form a solid coherent gel, haloalkylating the gel and treating the haloalkylated gel with a solution of a compound selected from the group consisting of ammonia and an aliphatic amine while retaining substantially the same solvent concentration, said amine having the formula $NR_3$, where R is selected from the group consisting of hydrogen and aliphatic radicals containing no more than 4 carbon atoms and mixtures thereof.

13. The method of forming a solid anion permeable unfractured infusible structure in the form of a sheet of copolymer of a vinyl N-heterocyclic compound and a polyvinyl aromatic hydrocarbon comprising dissolving polymerizable polyvinyl aromatic hydrocarbons, and the substituted halo and alkyl derivatives thereof, in combination with a N-heterocyclic vinyl compound to the extent of at least 15 mol percent based upon total polymerizable ingredients, in from about 20% to 70% of an organic solvent by volume on total volume, disposing said solution with a reinforcing material therein to a sheet form, polymerizing the solute under conditions substantially preventive of the escape of solvent to form a solid coherent gel, halo alkylating the gel and treating the haloalkylated gel with a compound of the group consisting of ammonia and an aliphatic amine while retaining substantially the same solvent concentration.

14. The method of claim 13 wherein the N-heterocyclic compound is selected from the group consisting of 2 vinyl pyridine, 4 vinyl pyridine and 2 vinyl 5 ethyl pyridine.

15. The method of claim 14 wherein the aliphatic amine is selected from the group consisting of trimethylamine, dimethyl ethyl amine and dimethyl ethanol amine.

16. The method of transferring anions from one solution to another to the substantial exclusion of the transfer of cations, comprising separating the solutions by at least one solid unfractured continuous sheet, said sheet comprising: an insoluble, infusible polymeric matrix containing polyvinyl aromatic and vinyl N-heterocyclic compounds and having dissociable quaternary ammonium groups bound to the aromatic nuclei in gel relationship with about 20% to about 70% by volume of an aqueous solvating liquid as a continuous phase, said matrix having imbedded therein a reinforcing material, and passing a direct electric current through said solutions and sheet in series, thus effecting migration of said anions from one solution through said sheet into the other solution.

References Cited in the file of this patent

UNITED STATES PATENTS

| | | |
|---|---|---|
| 2,540,985 | Jackson | Feb. 6, 1951 |
| 2,629,710 | McBurney | Feb. 24, 1953 |
| 2,681,319 | Bodamer | June 15, 1954 |
| 2,732,351 | Clarke | Jan. 24, 1956 |